United States Patent [19]
Evin

[11] Patent Number: 6,026,908
[45] Date of Patent: Feb. 22, 2000

[54] BLADE, PARTICULARLY FOR BLADE-BEARING CHASSIS

[76] Inventor: Michel Evin, Le Petit Beauce, 44850 Ligne, France

[21] Appl. No.: 09/091,992

[22] PCT Filed: Dec. 27, 1996

[86] PCT No.: PCT/FR96/02095

§ 371 Date: Jun. 26, 1998

§ 102(e) Date: Jun. 26, 1998

[87] PCT Pub. No.: WO97/24024

PCT Pub. Date: Jul. 10, 1997

[30] Foreign Application Priority Data

Dec. 29, 1995 [FR] France .................................. 95 15734

[51] Int. Cl.⁷ ..................................................... A01B 13/08
[52] U.S. Cl. .......................... 172/699; 172/769; 172/770; 172/772.5; 172/771
[58] Field of Search ..................................... 172/699, 700, 172/771, 192, 730, 765, 769, 770, 772, 772.5, 753; 37/446, 452, 448, 450

[56] References Cited

U.S. PATENT DOCUMENTS

| | | | |
|---|---|---|---|
| 4,316,508 | 2/1982 | Whitfield | 172/699 X |
| 4,409,912 | 10/1983 | Koronka et al. | 172/699 X |
| 4,817,727 | 4/1989 | Mielke et al. | 172/699 X |
| 5,050,685 | 9/1991 | Harrison | 172/699 |
| 5,119,888 | 6/1992 | Hall | 172/699 |
| 5,415,236 | 5/1995 | Williams | 172/699 |
| 5,605,196 | 2/1997 | Grimm et al. | 172/699 X |
| 5,787,991 | 8/1998 | Tuttle | 172/700 X |

*Primary Examiner*—Victor Batson
*Attorney, Agent, or Firm*—Young & Thompson

[57] ABSTRACT

A blade includes at least one blade body attached to a chassis to be hitched to a tractor vehicle. The blade includes at least one part which is laterally inclined in relation to a vertical plane parallel to the tractor vehicle's line of advancement. This inclined part includes a heel at a positive angle to the ground. The heel is equipped with a wear plate having at least one tip that is laterally displaced in relation to the front edge of the inclined part of the blade body and in relation to the front edge of the heel.

15 Claims, 4 Drawing Sheets

BLADE, PARTICULARLY FOR BLADE-BEARING CHASSIS

FIELD OF THE INVENTION

The present invention relates to a blade, in particular for a blade-carrying chassis which is to be hitched to a tractor vehicle, this blade comprising at least one blade body fixed to said chassis.

BACKGROUND OF THE INVENTION

Packing of soil is of progressively greater problem in agricultural regions. In soils subject to packing, the repetition of work and use of heavy materials give rise to compact regions, truly barriers to the development of roots and the movement of water. It becomes necessary therefore these days to loosen soils by causing a decompaction and a division of the compact region so as thereby to reestablish the natural system of passages and discontinuities in the ground without substantially disturbing the surface. The decompacting devices must therefore nowadays effectively break up the beds by loosening the soil evenly over the width and the depth that is worked. The design of the blades is a determining factor to meet this problem. It has been known for 70 years that there has been a development of blades provided on the market. The decompacting blades for 70 years have been all characterized by a working portion, called a body, essentially vertical and a heel disposed at the level of the lower edge of the body in said vertical plane formed by the body. There results a certain number of drawbacks. Thus, high power is absorbed, strong lateral compression is caused and there is a smoothing behind the working area. Finally, the profile of the worked surface obtained was heterogeneous and the structure of the soil was overturned.

To overcome these drawbacks, it has been proposed to develop during the last 80 years, curved blades which have, relative to a vertical plane, an inclination at the level of the body, of about 45°, or even greater than 45°. These blades were provided with wear members generally made in several parts and located in the forward or rear portion of the blade. Thus, there was provided at the rear of each blade a vane whose inclination was adjustable, this vane permitting more or less accentuating the raising and breaking up of the ground as a function of its nature and its moisture. These blades however had different drawbacks. They were in the first place entirely too complicated to produce, relatively fragile and difficult to maintain. Moreover, the surface aspects obtained by means of these blades was difficult to control. Thus, the raising action exerted by these blades was an oblique raising action connected to the great inclination of the body. From this great inclination resulted a so-called "cathedral" effect.

It thus seemed necessary to develop a blade not having the mentioned drawbacks, namely a blade permitting loosening the soil by a substantially vertical raising action giving rise to no smoothing effect of the ground and not overturning the layers of dirt.

SUMMARY OF THE INVENTION

The object of the present invention is therefore to provide a blade whose action permits loosening the soil, by a vertical raising action, without however overturning the structure of the soil and in particular the arrangement of the layers of earth and without giving rise to noticeable raising of stones which would correspond to an action of separating the constituent elements of the soil.

Another object of the present invention is to provide a blade which, by its design, gives rise to regular and homogeneous loosening over all the width worked.

Another object of the present invention is to provide a blade which almost substantially absorbs the lateral forces that arise during raising of the soil, particularly when it passes over the wear member.

To this end, the invention relates to a blade, in particular for a blade-carrying chassis which must be dragged by a tractor vehicle, this blade comprising at least one blade body fixed to said chassis, characterized in that said blade body has, in its working portion, at least one portion inclined laterally relative to a vertical plane parallel to the axis of advancement of the tractor vehicle to form relative to said vertical plane an angle $\alpha$ comprised within the angular range of 5–20°, preferably about 9°, this inclined portion being prolonged laterally to or into the vicinity of its lower edge with a heel of positive entry angle in the direction of the soil, this heel being provided with at least one wear member constituted by at least one point, this point being laterally offset relative to the front edge of said attack edge of the inclined portion of the blade body to exert a raising action on a strip of soil of which the resultant is essentially vertical.

Because of the design of this blade, there will be seen a vertical raising action of the blade to the level of the point of the wear member and if desired of the heel and an absorption of lateral forces thanks to an inclined portion of the blade body which permits an increase of the volume of soil without impeding the raising action.

According to a first preferred embodiment of the invention, the heel and the wear member constitute a monoblock member.

According to a second preferred embodiment of the invention, the wear member is adjoined to said heel and is secured to the blade body in a suitable manner.

BRIEF DESCRIPTION OF THE DRAWINGS

The invention will be better understood from the reading of the following description, of one embodiment, with reference to the accompanying drawings, in which.

DETAILED DESCRIPTION OF THE INVENTION

The blade 1, according to the invention, is adapted to be installed on the chassis 2 that carries blades 1 before itself being drawn behind a tractor vehicle. Generally, a same chassis is provided with several blades. Each blade 1 comprises at least one blade body 3 fixed to said chassis 2. Generally, this blade body 3 is fixed to said chassis so as to be adapted to pivot about an axis which is substantially horizontal and perpendicular to the direction of movement of the tractor vehicle so as to permit retraction of the blade in case of encountering an obstacle, in known manner.

Figure 2:
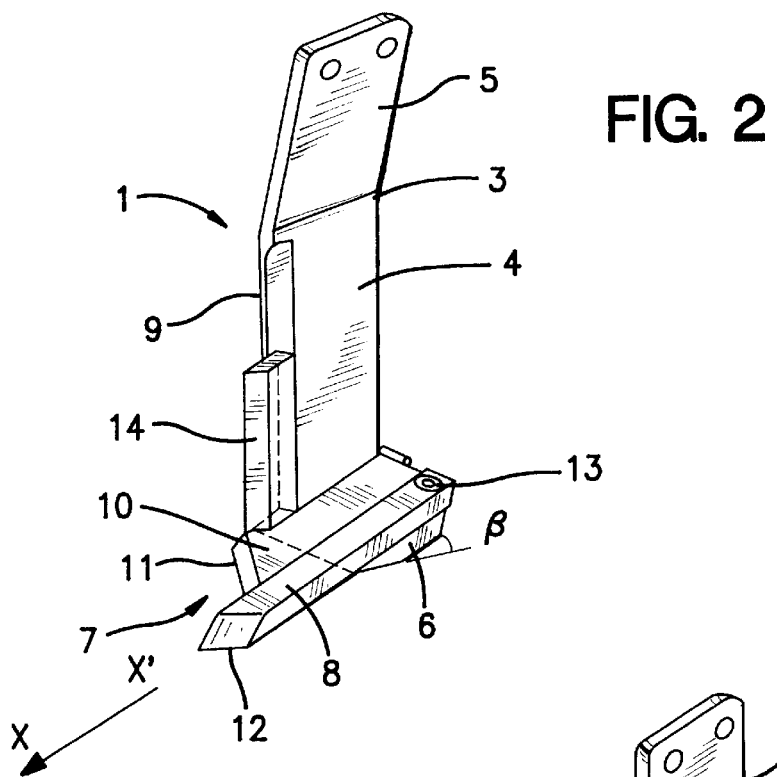
FIG. 2 shows a perspective view of a blade in the assembled condition of the constituent elements.

The portion of the blade body 3 which is to be fixed to the chassis, shown at 5 in FIG. 2, can have a large number of shapes. In the illustrated embodiment, this portion is a substantially vertical portion, which is to say contained in a vertical plane parallel to the axis XX' of forward movement of the tractor vehicle. On the other hand, the working portion of the blade body 3, which is to say the portion of the blade adapted to penetrate the soil in the working position of the blade carrying chassis, comprises at least one portion 4 laterally inclined relative to a vertical plane parallel to the axis XX' of forward movement of the tractor vehicle, to form relative to said vertical plane an angle α comprised in the angular range 5–20°, preferably about 9°. This inclined portion permits absorbing the lateral forces connected with the raising action generated by said blade. Too great an inclination of this portion would give rise on the other hand to disturbance of the raised layer of dirt.

Figure 3:
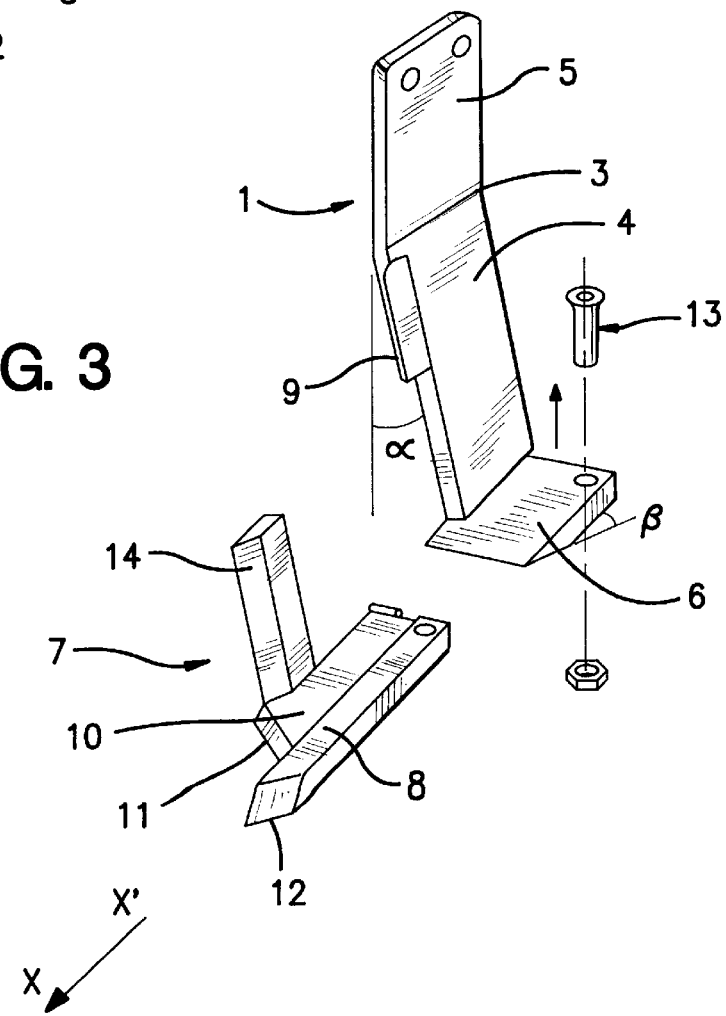
FIG. 3 shows a perspective view of the blade shown in FIG. 2 in an exploded position of said constituent elements.

This inclined portion 4 is prolonged laterally to or into the vicinity of its lower edge with a heel 6 that makes a positive angle with the surface of the ground. This heel is generally present in the form of a relatively thin member extending in a substantially horizontal plane. This surface is moreover inclined at an angle β comprised between 2 and 20°, preferably about 12°, relative to the horizontal plane, as shown in FIG. 3.

This heel 6 is provided with a wear member 7 constituted by at least one point 8. This point 8 is offset laterally relative to the front edge 9, the so-called attack edge, of the inclined portion 4 of the blade body 3, to exert a raising action on a strip of dirt whose resultant is essentially vertical. The positioning of this point 8 distinguishes this blade from all prior blades. Thus, the lateral offset between the point and the front edge 9 of the inclined portion of the body permits obtaining a vertical raising action which is not oblique and an absorption of the lateral forces by said inclined portion 4. This guarantees minimum disturbance of the soil.

Figure 5:
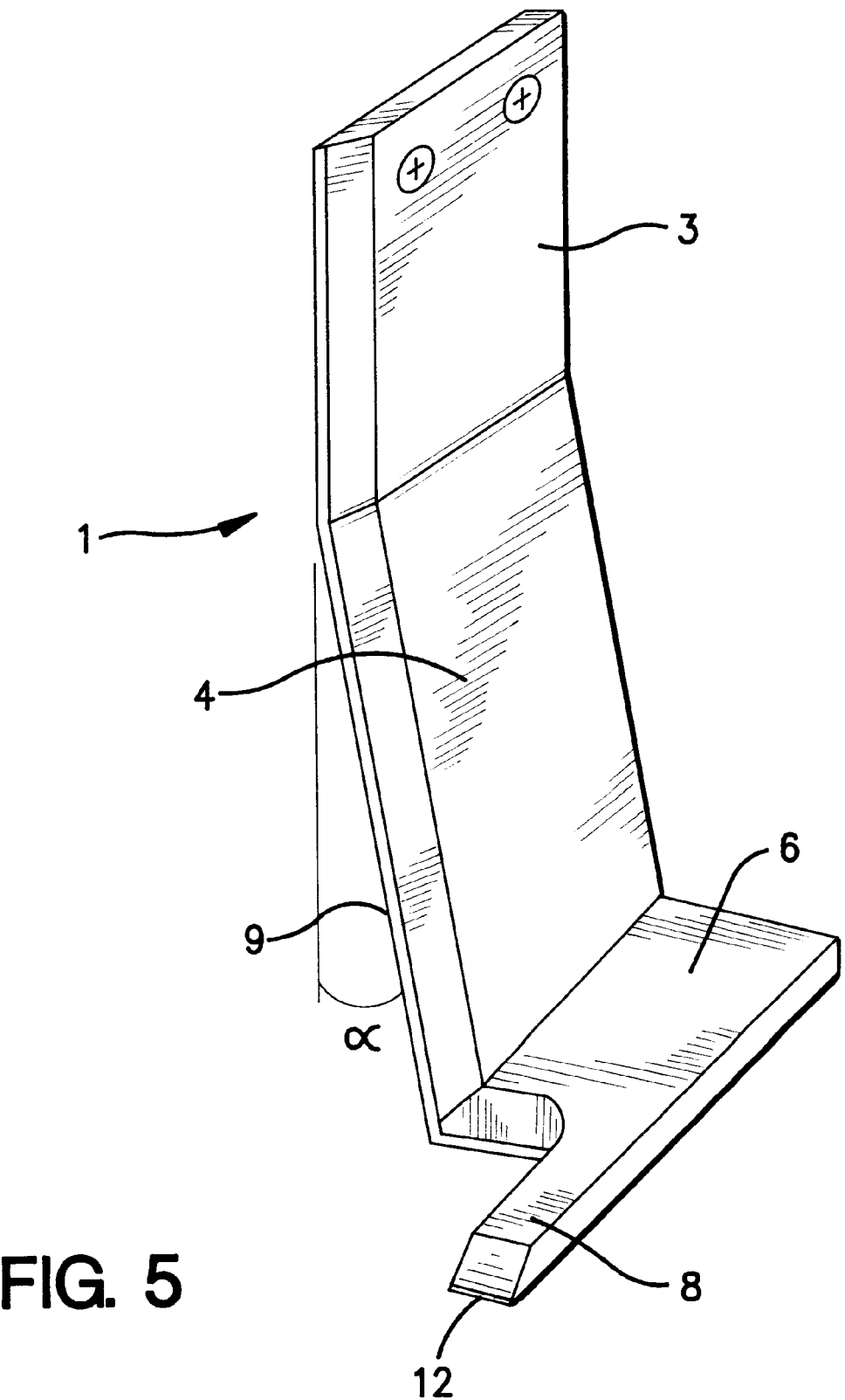
FIG. 5 shows a perspective view of a blade according to another embodiment of the invention.

The heel 6 and the wear member 7 can have a large number of shapes. In the example shown in FIG. 5, the heel 6 and the wear member 7 constitute a one-piece construction. In this case, the point 8 is disposed in lateral prolongation of the heel 6 and in the same plane as this latter. In this case, the point 8 delimits a front cutting edge 12 disposed upstream of the front edge of said heel relative to the direction of advance XX' of said tractor vehicle. This characteristic is a characteristic which is common to all of the blades described hereafter. It is thus important that the raising action by means of the point is exerted before penetration of the front edge of the heel into the soil and before ultimate penetration of the attack edge of the front edge 9 of the inclined portion 4 of the blade body 3 into the soil.

Figure 4:
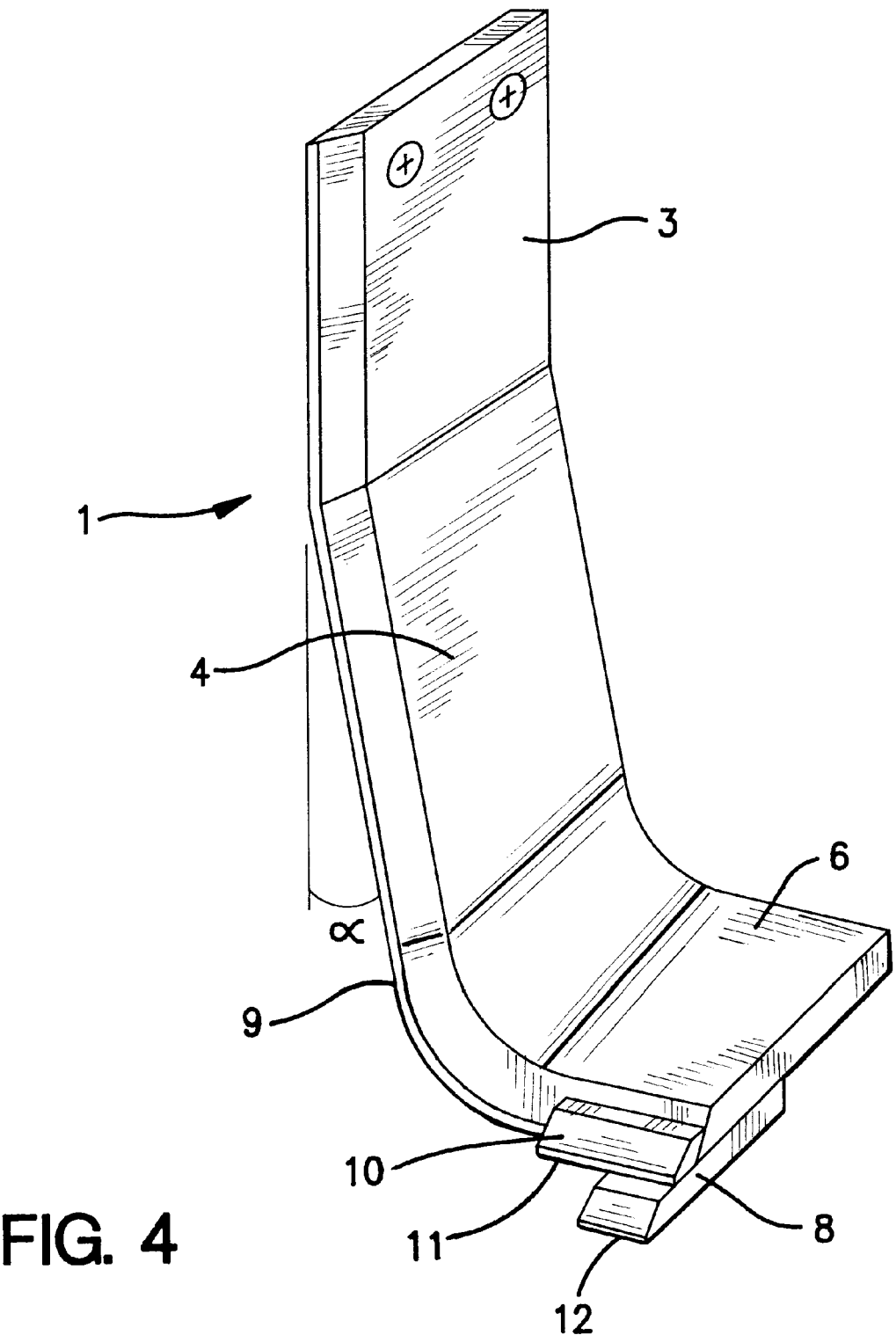
FIG. 4 shows a perspective view of another embodiment of the blade shown in FIGS. 1 and 2.

In another embodiment according to FIGS. 2 and 4, the wear member 7 is connected to said heel 6 and is secured to the body 3 of blade 1 in a suitable manner. In the examples of FIGS. 2 and 3, the wear member 7 is secured to the blade body 3 by means of a single securement bolt 13 adapted mechanically to couple the wear member 7 with the heel 6 of the body 3 of the blade. This gives the advantage of rapid mounting and hence rapid dismounting of the wear member 7 of the body 3 of the blade. Maintenance is hence facilitated. In the example shown in FIG. 4, the wear member 7 is constituted, in addition to the point 8, by a flat connecting member 10, point 8 and the flat connecting member 10 coming to bear on said heel 6 of the body 3 of the blade and delimiting respectively the front cutting edges 12 and 11 disposed upstream of the front edge of said heel 6 relative to the direction of advancement XX' of the tractor vehicle. It will be noted that in this case, the point 8 of the wear member 7 is disposed on the lower surface of said heel 6, this point 8 delimiting a front cutting edge 12 disposed upstream of the front edge of said heel relative to the direction of advancement of said tractor vehicle. The connecting flat member is itself disposed on the upper surface of said heel.

Another solution which consists in arranging the point 8 of the wear member 7 on the upper surface of said heel 6, this point, delimiting a front cutting edge 12 disposed upstream of the front edge of said heel 6 relative to the direction of advance XX' of said tractor vehicle, can also be envisaged. An example of it is shown in FIGS. 2 and 3. It will also be noted, from FIGS. 3 and 4, that the connection zone between inclined portion 4 of the blade and heel 6 can be constituted by a curved portion, as shown in FIG. 4, or by a portion forming an obtuse angle, as shown in FIG. 3.

Figure 1:
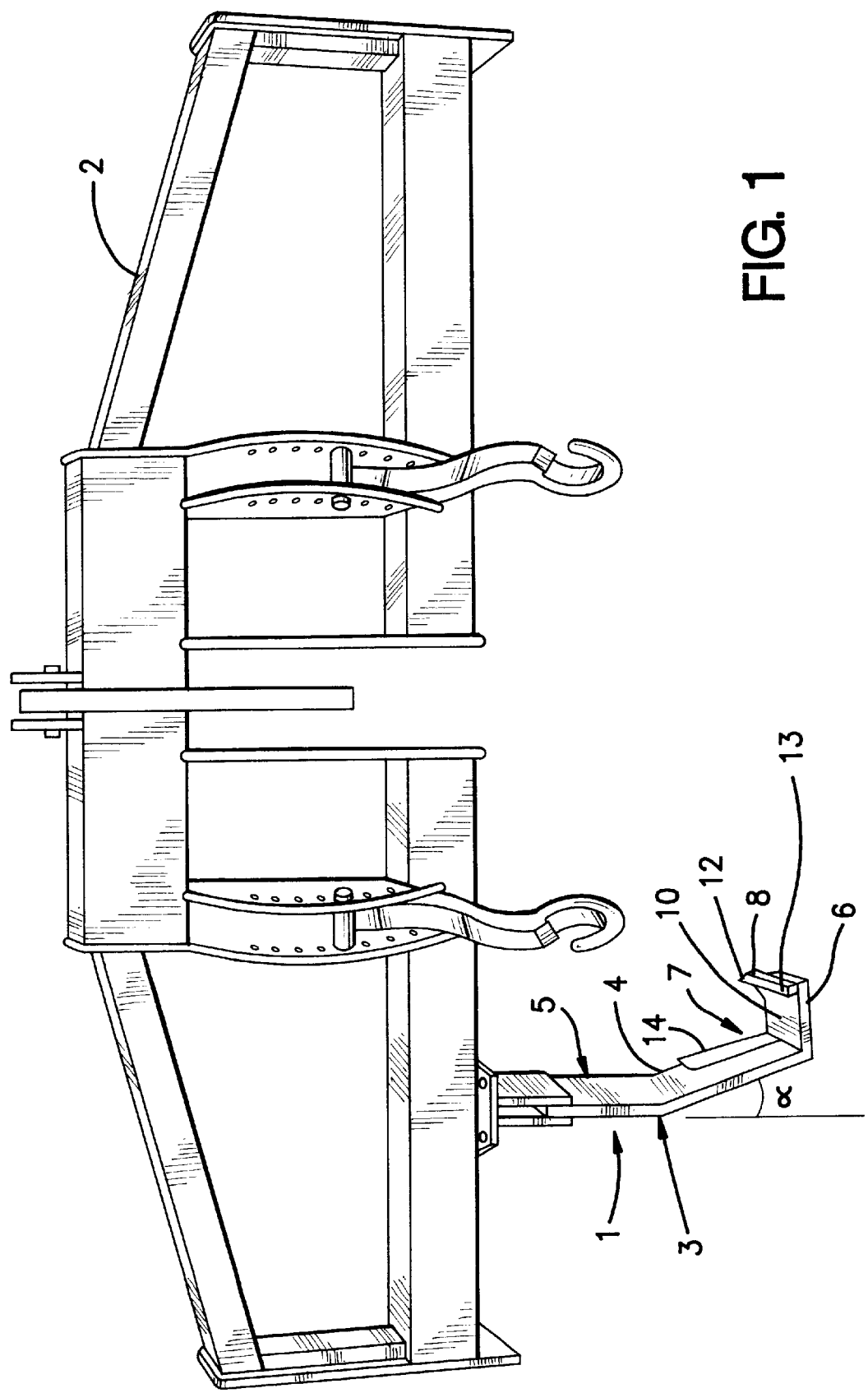
FIG. 1 is a rear perspective view of a chassis provided with a blade according to the invention, this chassis being adapted to be secured behind a tractor vehicle.

In the examples of FIGS. 1 to 3, the wear member 7 comprises moreover an attack edge 14 which comes to bear on the inclined portion 4 of the body 3 of the blade and projects slightly from the front edge 9 of said blade body. In the illustrated example, the wear member 7, constituted by the attack edge 14, by the flat connector 10 and by the point 8, is formed of a single piece so as again to facilitate mounting of said wear member on the blade body. It will also be noted that the front cutting edges of the attack edge 14, of the flat connection member 10, and of the point 8 are offset axially relative to the axis XX' of forward movement of the vehicle, the front cutting edge 12 of the point 8 being located in front of the cutting edge 11 of the flat connection member 10, itself located in front of the cutting edge of the attack edge 14. This positioning of the front cutting edges promotes the penetration of the wear member into the soil without however disarranging the soil.

Thanks to the essentially vertical raising action exerted by the working members constituted by the wear member 7 and the working portion of the body 3 of the blade, there is obtained homogeneous loosening of the soil. This raising action can be slightly modified as a function of the inclination β formed by the heel 6 with a substantially horizontal plane. Thanks to the raising action of the point 8 combined with the lateral force absorption action connected to the increase of volume of soil during its raising by the inclined portion 4 of the blade, the structure of the soil will remain completely preserved as to surface and depth. There is thus obtained high output with minimum energy.

It is to be noted that this blade can be associated with colters, rotatable tools, rollers, etc. located in front of or behind the blade and carried either by the blade-carrying chassis or by the chassis of a supplemental tool. However, independently of the number of tools disposed on the device for loosening the soil, the blades continue to fulfill their essential function of loosening. This loosening can be particularly necessary to replace springtime work so as to prepare the soil for seeding. It can also be used in other seasons when necessary to aerate choked and compacted regions, by for example the passage of machines or animal hooves. It can also be necessary to loosen the soil after drainage to ensure good circulation of water toward the drains.

I claim:

1. In a blade for a blade-carrying chassis to be drawn by a tractor vehicle, this blade comprising at least one blade body fixed to the chassis, the blade body having at least one portion that is inclined laterally relative to a vertical plane parallel to a direction of advance of the tractor vehicle to form relative to this vertical plane an angle of 5–20°, the improvement in which the inclined portion comprises, adjacent to a lower edge thereof, a heel of positive angle in a direction of ground, this heel being provided with at least one wear member comprising at least one point that is offset from a front edge of the heel relative to the direction of advance and that is offset laterally from an attack edge of the inclined portion of the body of the blade to exert a raising action on a strip of soil whose resultant movement is substantially vertical.

2. The blade according to claim 1, wherein the heel and the wear member constitute a single piece.

3. The blade according to claim 1, wherein the wear member is connected to said heel and is secured to the body of the blade.

4. The blade according to claim 3, wherein the wear member is secured to the blade body with a single securement bolt that couples mechanically the wear member with the heel.

5. The blade according to claim 1, wherein the point of the wear member is disposed on one of a lower surface and an upper surface of said heel, this point having a front cutting edge disposed in front of the front edge of said heel relative to the direction of advance of said tractor vehicle.

6. The blade according to claim 5, wherein the wear member further comprises a connecting plate that bears against said heel and includes a front cutting edge disposed in front of the front edge of said heel relative to the direction of advance of the tractor vehicle.

7. The blade according to claim 6, wherein the wear member further comprises an attack edge coming to bear on the inclined portion of the body and projecting slightly from a front edge of said blade body.

8. The blade according to claim 6, wherein the wear member, constituted of the front cutting edges, of the connecting plate, the point, is one-piece.

9. The blade according to claim 7, wherein the attack edge of the wear member, the front cutting edge of the connecting plate, and the front cutting edge of the point are offset axially relative to the direction of advance of the vehicle, the front cutting edge of the point being located before the front cutting edge of the connecting plate which is located in front of the attack edge.

10. A blade for decompacting soil, comprising:

a blade body with a planar portion and an inclined portion depending therefrom, said inclined portion being inclined relative to said planar portion and having a front edge facing a first direction and a lower edge; and an L-shaped soil decompacting portion, a distal end of a first leg of said L-shaped decompacting portion being attached to and projecting substantially at a right angle from said inclined portion adjacent to said lower edge, and a second leg of said L-shaped cutting portion being spaced from said inclined portion and projected in said first direction beyond said front edge of said inclined portion, a distal end of said second leg having a first soil cutting edge facing said first direction.

11. The blade of claim 10, wherein said soil decompacting portion is one piece.

12. The blade of claim 10, wherein said first leg comprises a generally planar heel and said second leg comprises a wear member that is removably attached to said heel and that includes said first soil cutting edge.

13. The blade of claim 12, wherein said removably attachable wear member further comprises a second soil cutting edge on an edge of said heel facing in said first direction and a third soil cutting edge that extends along said front edge of said inclined portion.

14. The blade of claim 12, wherein said wear member is removably attached to a lower surface of said heel.

15. The blade of claim 12, wherein said wear member is removably attached to an upper surface of said heel.

* * * * *